(12) United States Patent
Jourdy

(10) Patent No.: US 12,030,466 B2
(45) Date of Patent: Jul. 9, 2024

(54) METHOD FOR MANAGING THE HYDROGEN SUPPLY OF VEHICLES

(71) Applicant: LOJELIS HOLDING, Royat (FR)

(72) Inventor: Sylvain Jourdy, Royat (FR)

( * ) Notice: Subject to any disclaimer, the term of this patent is extended or adjusted under 35 U.S.C. 154(b) by 168 days.

(21) Appl. No.: 17/686,701

(22) Filed: Mar. 4, 2022

(65) Prior Publication Data

US 2022/0281422 A1    Sep. 8, 2022

(30) Foreign Application Priority Data

Mar. 5, 2021   (FR) ..................................... 2102143

(51) Int. Cl.
*B60S 5/02* (2006.01)
*G06Q 50/06* (2024.01)

(52) U.S. Cl.
CPC ............... *B60S 5/02* (2013.01); *G06Q 50/06* (2013.01); *Y10T 137/3802* (2015.04)

(58) Field of Classification Search
CPC ............................. Y10T 137/3802; B60S 5/02
See application file for complete search history.

(56) References Cited

U.S. PATENT DOCUMENTS

| | | | | |
|---|---|---|---|---|
| 10,893,555 B1* | 1/2021 | Han | ............... | B60L 53/665 |
| 2002/0116204 A1* | 8/2002 | Willner | ................ | B67D 7/08 700/231 |
| 2003/0164202 A1* | 9/2003 | Graham | ................ | B60S 5/02 141/98 |
| 2012/0111447 A1 | 5/2012 | Mori et al. | | |
| 2017/0362076 A1* | 12/2017 | Hall | ................ | H04W 4/44 |
| 2017/0363432 A1* | 12/2017 | Hall | ................ | B67D 7/04 |
| 2018/0339682 A1* | 11/2018 | Hall | ................ | G06Q 20/145 |
| 2019/0016312 A1 | 1/2019 | Carlson et al. | | |
| 2019/0023236 A1* | 1/2019 | Webb | ................ | B60S 5/00 |
| 2019/0031156 A1* | 1/2019 | Fukuda | ................ | B60S 5/02 |
| 2019/0086031 A1* | 3/2019 | Fujisawa | ................ | B60S 5/02 |
| 2019/0095872 A1* | 3/2019 | Lalwani | ............ | G06Q 30/0633 |
| 2019/0255952 A1 | 8/2019 | Cun | | |
| 2020/0164840 A1* | 5/2020 | Smith | ................ | B60S 5/02 |
| 2020/0180571 A1* | 6/2020 | Lei | ................ | G06Q 50/06 |
| 2020/0198594 A1* | 6/2020 | Petershagen | ............ | B60L 53/60 |
| 2020/0247252 A1* | 8/2020 | Dudar | ................ | H01M 10/615 |
| 2020/0247386 A1* | 8/2020 | Dudar | ................ | B60W 10/24 |

(Continued)

FOREIGN PATENT DOCUMENTS

FR    2984254 A1    6/2013
FR    3082276 A1    12/2019

*Primary Examiner* — Daphne M Barry
*Assistant Examiner* — Frederick D Soski

(57) ABSTRACT

A method for communicating regarding supply of hydrogen of a moving vehicle to one or more distribution stations begins by collecting at least two parameters relating to the vehicle during its movement by two or more sensors onboard the vehicle. The parameters include at least the current location of the vehicle. Next, the parameters are transmitted to a control module. At least one parameter relating to hydrogen available in the one or more distribution stations is then collected by another sensor, which then transmits the hydron availability parameters to the control module. A hydrogen distribution station is then identified while the vehicle is moving, and a user of the vehicle is informed of available hydrogen distribution stations and of hydrogen supply conditions in the identified distribution stations.

8 Claims, 1 Drawing Sheet

(56) References Cited

U.S. PATENT DOCUMENTS

| | | | |
|---|---|---|---|
| 2020/0255281 A1* | 8/2020 | Leone | G06F 7/00 |
| 2020/0269835 A1* | 8/2020 | Hara | H04W 4/48 |
| 2020/0276909 A1* | 9/2020 | Boisen | B60L 53/66 |
| 2021/0054969 A1* | 2/2021 | Scott | B67D 7/302 |
| 2021/0199451 A1* | 7/2021 | Murata | F17C 5/06 |
| 2021/0245719 A1* | 8/2021 | Hall | B60S 5/02 |
| 2021/0398383 A1* | 12/2021 | Krishnappa | B60S 5/046 |

* cited by examiner

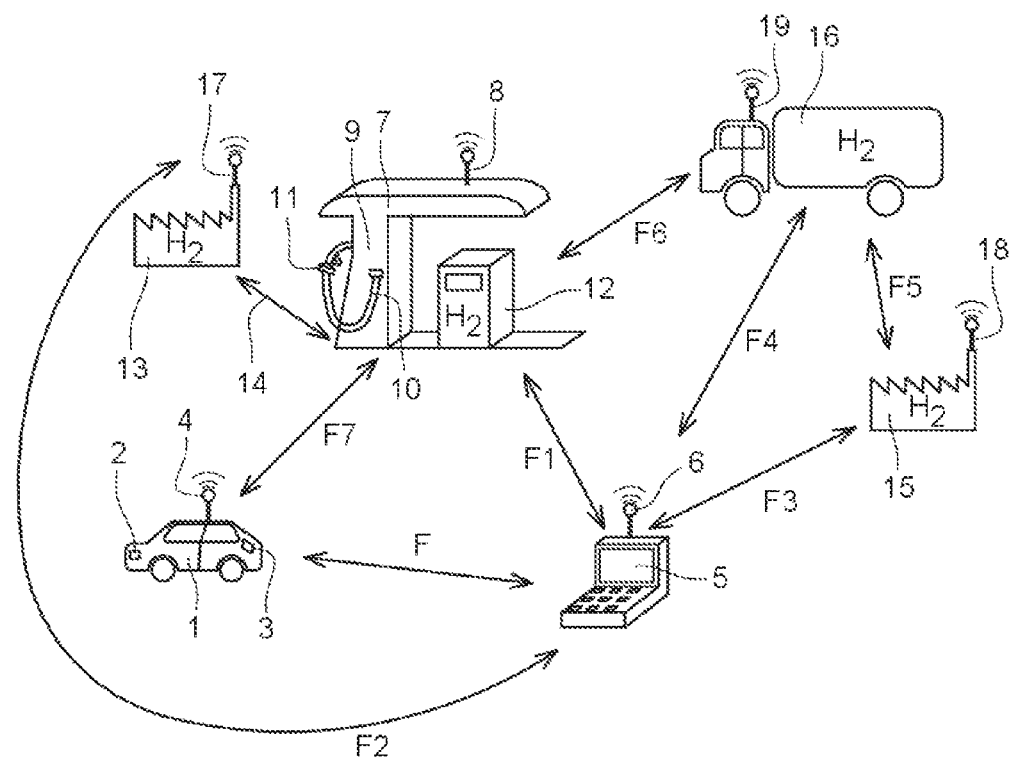

METHOD FOR MANAGING THE HYDROGEN SUPPLY OF VEHICLES

The present invention relates to a method for managing the hydrogen supply of vehicles.

The term "vehicle" here encompasses all types of vehicles, whether land, rail, sea or air. By way of non-limiting examples, mention may be made of cars, trucks, two-wheelers, agricultural machinery, public works machinery, buses, planes, trains, ships, barges or the like. In these vehicles, at least the driving force necessary to move the vehicle, or even also the driving force to actuate at least one tool mounted on the vehicle, is provided by an electric motor. A fuel cell or hydrogen cell installed on the vehicle produces electricity. In this way, this type of vehicle is at least partially freed from recharging with electricity at a fixed charging station.

DESCRIPTION OF RELATED ART

Hydrogen is a chemical element that is present in many natural compounds in large quantities, but which practically does not exist in the molecular state in nature. It must therefore be produced using various methods such as reforming or gasification of hydrocarbons such as methane, water electrolysis, or the thermochemical dissociation of water or biomass. The method is chosen based on many parameters, including inter alia the type of primary energy required, the yield, the presence of impurities, and the co-products or waste generated. Almost all of the hydrogen produced today comes mainly from reforming natural gas. Water electrolysis is only used for small- or medium-capacity productions, if electricity is cheap and/or if a high purity of the hydrogen produced is required. Whatever its method of production, hydrogen is always obtained in the gaseous state. The liquid state is obtained by successive expansions of the gas, down to a temperature of minus 253° C. Maintaining the liquid state of hydrogen at this temperature requires significant means of cold production. Therefore, the distribution and storage of hydrogen, at least for use thereof in vehicles, is carried out mainly in gaseous form, generally at pressures of 35 MPa or 70 MPa, which are the pressures currently used by motor vehicle manufacturers. Storage and use in liquid form are reserved for large facilities and for so-called heavy vehicles, such as trucks or buses. Currently, there are two types of hydrogen distribution stations for vehicles: those distributing hydrogen from one or more tank(s) and supplied by trucks, railways, maritime routes or gas pipelines, similar to current gas stations, and those with an autonomous hydrogen production unit. In all cases, the technical constraints of hydrogen storage and/or production are significant, in terms both of equipment, production, distribution and/or storage protocol and of implementation time. Thus, replenishing a hydrogen distribution station or carrying out a hydrogen production cycle is not as simple and quick as replenishing a hydrocarbon distribution station.

Moreover, during distribution, and therefore during filling of the vehicle's hydrogen tank, the gas expands, the hydrogen still being present in the distribution station at a pressure higher than that used in the vehicle, 35 MPa or 70 MPa, so that the filling of the vehicle tank takes place essentially by pressure difference. The expansion of the hydrogen contained in the station's tank during the filling of the vehicle's tank produces heating of the gas, the volume occupied by the gas varying according to the Joule-Thomson law. During this filling, the pressure of the hydrogen in the vehicle's tank increases sufficiently rapidly for this compression of hydrogen in the vehicle's tank to be considered adiabatic, the heat exchanges not having time to occur. This results in a rise in temperature of the hydrogen in the vehicle's tank, which may reach several tens of degrees Celsius. This rise in temperature depends on several factors, in particular the filling speed of the vehicle's tank and the pressure difference between the tanks of the station and of the vehicle. When the temperature of the vehicle's tank has dropped and returned to ambient temperature, the pressure of the hydrogen in the vehicle's tank will have decreased, according to Gay-Lussac's law. Thus, the final pressure in the vehicle's tank may be lower than initially expected. To guarantee the delivery of the desired quantity and to keep the final pressure of the hydrogen in the vehicle's tank at the initial level as much as possible, it is common for the hydrogen stored in the distribution station to be cooled to around −40° C. so that the heating during the filling of the vehicle's tank brings the hydrogen in the tank close to the ambient temperature, provided that the climatic conditions are not extreme.

In a distribution station, when electricity is easily available either via the electricity grid or via alternative sources such as wind or photovoltaic, hydrogen may be produced on site in the gaseous state, for example by water electrolysis, before compression, temporary storage and distribution. The oxygen from the water electrolysis is a by-product that is advantageously recovered rather than released into the atmosphere. Hydrogen production by the distribution station is particularly suitable for relatively small facilities intended to supply light vehicles. However, a complete hydrogen production cycle ready for distribution requires some time.

Thus, there is a risk that a distribution station will run out of hydrogen to distribute, for a more or less long time depending on whether the station is supplied from an external production facility or whether it produces hydrogen itself. This risk is all the more penalizing for the user since the number of hydrogen distribution stations is still limited and the user therefore may not have sufficient autonomy to reach a more or less distant station having sufficient hydrogen, or at least a sufficient quantity for the user to be able to continue his journey and for this hydrogen to be available within a period that is acceptable to the user. Moreover, both the complexity of the production and/or storage techniques and the presence of production and/or storage peaks lead to high hydrogen production and distribution costs. A solution is known from US-A-2019255952 in which the hydrogen distribution stations communicate with the vehicles. Depending on the vehicle parameters transmitted to the station, the latter adapts its production and provides the vehicle with its geolocation so that the driver can refuel. with such a device, it is assumed that the station is always able to refuel the vehicle, since it must adapt its production based on the vehicles located nearby and their estimated needs. However, the driver does not have all the information on the distribution conditions or on whether, when he arrives at the station, the latter will always be able to supply it.

There is therefore a need on the one hand to plan the supply of hydrogen to a distribution station as well as possible and on the other hand to plan the refueling with hydrogen by a user from the distribution station. The invention proposes to address this dual need by offering a method for managing the supply of hydrogen to vehicles, optimizing the production or restocking of hydrogen at distribution stations as well as the supply of hydrogen to vehicles, with control of production and purchase costs, both for the distribution stations and the users, the latter being able to go to the distribution station with the certainty of obtaining hydrogen under the desired optimal conditions.

BRIEF SUMMARY OF THE INVENTION

To this end, the object of the invention is a method for managing the supply of hydrogen to moving vehicles from hydrogen distributed by distribution stations, comprising the steps of:
- a) collecting, by at least two sensors on board a vehicle, at least two parameters relating to the operation and driving of the vehicle during its movement, including at least the geolocation of the vehicle and its hydrogen needs,
- b) transmitting the parameters relating at least to the hydrogen needs of the vehicle and to its geolocation to a control module,
- c) collecting, by at least one sensor present in at least one hydrogen distribution station, at least one parameter relating to the hydrogen available in the hydrogen distribution station,
- d) transmitting at least this parameter relating to the hydrogen available in the hydrogen distribution station to the control module, characterized in that it comprises at least the following steps:
- e) identifying, by the control module, at least one hydrogen distribution station that can refuel the vehicle during its movement,
- f) informing the user of the vehicle of at least one hydrogen distribution station capable of refueling the vehicle during its movement and of the hydrogen refueling conditions in the identified hydrogen distribution station.

Thus, owing to the invention, a means is available for real-time monitoring of the availability of hydrogen in the distribution stations and the hydrogen needs of the vehicles likely to refuel in the stations. The invention thus allows the user to optimize his refueling with hydrogen not only according to his journey, his driving, but also according to the availability of hydrogen at nearby stations.

According to advantageous but optional aspects of the invention, such a method may comprise one or more of the following steps:

Sensors for collecting parameters relating to the load of the vehicle, the tire pressure, the presence of a trailer, the acceleration of the vehicle are embedded in the vehicle.

the control module is housed in a server remote from the hydrogen distribution stations.

The control module is based on Artificial Intelligence.

During step f), a hydrogen price offer adapted to the needs of the user and to the availability of hydrogen in the suggested station is provided to the user.

During step f), the price offer takes into account the presence of a package and the user's preferences concerning the choice of the hydrogen distribution station.

during step f), the user is informed when he is at a defined distance from a hydrogen distribution station.

After step f), the user informs the control module of his choice.

After step f), the user has the possibility of indicating the distribution station selected for refueling and of making an appointment.

BRIEF DESCRIPTION OF THE VIEW OF THE DRAWING

The invention will be better understood and other advantages thereof will become clearer from the following description, which is provided by way of non-limiting example and makes reference to the enclosed drawing, in which:

FIG. 1 is a simplified schematic representation of an embodiment of the invention.

DETAILED DESCRIPTION OF THE INVENTION

FIG. 1 is a simplified schematic illustration of one embodiment of the invention.

The implementation of the method comprises at least one vehicle 1. Here, the vehicle 1 is a motor vehicle, of the passenger car type. Alternatively, it may be a transport vehicle such as a bus, a taxi, a truck, an agricultural machine, a public works machine, a railway vehicle, a ship or an air vehicle. It may therefore be any type of vehicle provided that the vehicle has a motor component, for its movement and/or for actuating at least one tool mounted on the vehicle such as a lifting arm, a tailgate, a tipper or the like, using hydrogen for its operation. In all cases, the vehicle is equipped, in a removable or permanent manner, with at least two sensors, schematically illustrated by reference numeral 2, allowing at least two parameters relating to the vehicle 1 to be collected during its movement, including at least one parameter relating to the hydrogen needs of the moving vehicle and its geolocation. These are, for example, sensors such as a speed sensor connected to the tachometer of the vehicle and a sensor of the quantity of hydrogen available in the vehicle, for example by measuring the pressure in the hydrogen tank or by another parameter representative of the quantity of hydrogen remaining in the vehicle. Other sensors may be embedded in the vehicle in order to collect other parameters. These may be pressure sensors installed in the seats and allowing the number of people on board to be known, therefore allowing the load of the vehicle to be estimated. It may be at least one accelerometer providing indications on the type of driving of the vehicle, therefore de facto on the hydrogen consumption. Sensors indicating the state of the motor unit, the tire pressure, the presence of a trailer or a caravan or, in general, any type of sensor suitable for collecting a parameter affecting the driving of the vehicle and its hydrogen consumption may be provided.

In addition to the sensor(s) 2, the vehicle 1 is therefore equipped with a geolocation means, schematically illustrated by reference numeral 3. It may be either a transmission device connected to the GPS fitted to the vehicle 1 or a dedicated GPS, removable or not, on board the vehicle 1. As a variant, other geolocation means are provided. These are, for example, beacons using telephone networks, 4G/5G networks, radio waves or the like.

The vehicle 1 is also equipped with a communication device, referenced 4, which makes it possible to exchange information, and therefore to transmit and receive it, with at least one control module 5 constituting the implementation elements of the method that is the subject of the invention. The module 5 is also equipped with a communication device 6. The module 5 is advantageously located remotely, for example, at a distribution station manager, a vehicle fleet manager or a specialized service provider.

At least one hydrogen distribution station, referenced 7 and constituting the elements for implementing the method, is also provided with a communication device 8, The communication devices 4, 6 and 8 use transmission technologies that are known per se: Wi-Fi, telephone networks, 4G/5G networks, radio waves, satellite link or the like.

The hydrogen distribution station 7 comprises at least one member 9 for supplying hydrogen to a vehicle 1. Such a member 9 advantageously comprises at least one flexible pipe 10 and a connecting member 11 to the tank, not shown, of the vehicle 1. Such a member 11 is known per se. A station 7 may be equipped with several members 9. The station 7 also comprises a quantification unit, referenced 12, making it possible to know the exact quantity of hydrogen delivered by the station 7 and supplied to the vehicle 1 by the supply member 9. Advantageously, such a unit 12 uses at least one sensor placed on the connecting member 11 and/or on the flexible pipe 10 allowing a delivered quantity of hydrogen to be measured, independent of the ambient temperature, the initial temperature of the hydrogen and/or the initial and/or feed pressure of the hydrogen. As a variant, the station may distribute another source of energy, in addition to hydrogen, for example electrical energy via one or more recharging terminals and/or gas and/or LPG. It is also conceivable that such a station 7 may offer services other than energy supply, for example washing services, distribution of automobile-related products or services for the driver, such as catering.

As shown in FIG. 1, the distribution station 7 here is supplied with hydrogen by a production facility 13 integrated into the station 7 or at least close enough to be directly connected to the latter by a gas pipeline 14. Alternatively, the hydrogen is produced in a remote hydrogen production facility 15 allowing several stations 7 to be supplied. The hydrogen is transported between the facility 15 and the station 7 by known means, for example by tank truck 16. In all cases, the hydrogen production facilities 13, 15 and the means of transport 16 are also equipped with communication devices, respectively 17, 18 and 19. It is understood that the communication devices 4, 6, 17, 18 and 19 may use technologies that are identical or not, for example depending on the distances to be covered and/or the type of data to be transmitted and/or received.

The various steps of the method are now described with reference to the elements previously described. For greater readability, in accordance with FIG. 1, the method will be described for a vehicle, a distribution station, a hydrogen production facility integrated into the station, a remote hydrogen production facility and a means of delivery. It is understood that a control module may be in contact with several tens or even hundreds of distribution stations, facilities, delivery means and several hundreds or thousands of vehicles. Moreover, several control modules may cooperate with one another and/or be managed by a central control unit, for example on the scale of a country, by a hydrogen producer or a distribution station operator.

When a vehicle 1 is active and on the move, therefore when its various components are in the active configuration, typically when the engine is running and the components are supplied with electricity, it is automatically geolocated by the sensor 3. Simultaneously or concomitantly, the sensors 2 are in the active position and collect at least data relating on the one hand to the quantity of hydrogen available in the vehicle's tank and on the other hand information relating to the speed of the vehicle. If this information is sufficient to estimate an autonomy by a simple calculation based on the average consumption, whether theoretical or based on the history of the vehicle, other sensors 2 allow this estimate to be refined. To do this, as indicated above, the driving conditions, the vehicle load and, if necessary, other parameters such as traffic conditions, for example road traffic, the weather, the road condition, the condition and pressure of tires or the like are taken into account. In all cases, the data collected by the sensors 2, 3 are at least transmitted by the communication devices 8 and 6 to the control module 5, according to the double arrow F. According to an advantageous embodiment, these data are also displayed in the vehicle, for example via the vehicle's computer or via a dedicated computer. It is understood that the data may be stored either in the vehicle 1 and/or the control module 5 or even in a dedicated remote server, for example hosted on the cloud. In all cases, the data are advantageously exploited by Artificial Intelligence.

Data relating to the quantity of hydrogen available in at least one distribution station 7 are also transmitted by the communication device 8 to the control module 5, according to the double arrow F1. These data comprise not only the quantification of the hydrogen stock but also the hydrogen restocking forecasts for the station 7. This may be the current or planned hydrogen production by the production facility 13. These data are also provided by the communication device 17 to the control module 5 according to the double arrow F2. When the hydrogen production is remote from the station 7, these data relating to the production are transmitted by the communication device 18 of the facility 15 to the control module 5 according to the double arrow F3. The information relating to the delivery of hydrogen by the delivery means 16 is also transmitted by the communication means 19 to the control module 5 according to the double arrow F4. Alternatively, it is conceivable that a station 7 producing its hydrogen may, if necessary, either be supplied by a truck 16 or supply hydrogen to another station, the transport also being done by truck 16.

As shown in FIG. 1, the delivery means 16 also communicates, according to the double arrows F5 and F6, with the production facility 15 from which it took the hydrogen and with the distribution station 7 to which it must deliver the hydrogen, respectively. In this way, it is possible to optimize deliveries in terms of time, route and/or quantity of hydrogen to be delivered.

In all cases, these various data provided by the vehicle 1, the production facilities 13 and 15, the delivery means 16 and the distribution station 7 are taken into account by the control module 5. The latter uses Artificial Intelligence to identify at least one distribution station 7 as being the most relevant for resupplying a vehicle, in terms of distance, quantity of hydrogen and distribution conditions, in particular filling times. This information is transmitted to the vehicle 1 if the latter wishes to refuel. Advantageously, the control module 5 offers several stations 7 and associates a hydrogen purchase price offer therewith, for example per kilo. If the user of the vehicle 1 does not wish to follow the hydrogen refueling offer made by the control module 5, then the price offer will be reassessed when the user wishes to refuel. Advantageously, following the refueling offer sent by the module 5, the user, for example via a dedicated tactile or voice command, indicates his choice to the module 5 and/or to the station 7 concerned. Owing to the invention, there is a permanent exchange of information between the vehicle, and therefore its driver, and the station 7. this not only allows the production of hydrogen to be optimized, but also allows optimization of the movements of the vehicle 1; the driver can easily make an appointment for his refueling, with the guarantee that hydrogen is available and that his refueling will be carried out under good conditions, quickly and at a controlled price.

In the embodiment illustrated in FIG. 1, the vehicle 1 also communicates directly with the station 7, according to the double arrow F7. Such communication may take place either with one or a group of given stations 7, for example in the case of a subscription or a hydrogen supply package or for one or more favorite and frequently used stations, or with all stations 7 located in a determined area around the vehicle 1 in motion, or in several of these cases, successively according to the position of the vehicle 1. In all cases, such direct communication between the station 7 and the vehicle 1 allows the latter to inform the station of its arrival and, for example, to make an appointment or to indicate a time slot. The station may thus inform the vehicle of any change concerning the availability of hydrogen and also plan the production and distribution of hydrogen.

In one embodiment, the information relating to the availability of hydrogen is regularly updated and supplied, periodically or continuously, to the vehicle 1, the latter thus continuously having information relating to refueling with hydrogen. As a variant, this information is only available from a threshold of hydrogen remaining in the vehicle either chosen by the manufacturer of the vehicle 1 or by the user of the vehicle 1 or defined by the Artificial Intelligence on board the control module 5 according to the supply and the hydrogen needs at a given moment. Alternatively, the information is transmitted to the vehicle when the latter is at a given distance from a station 7.

In one embodiment, the user has a one-time package or a subscription with one or more hydrogen suppliers and in this case, the proposal provided by the control module 5 takes this parameter into account, favoring the concerned supplier(s) in the price offer.

Since the control module 5 is based on Artificial Intelligence, there is a permanent learning process relating to the vehicle, to the production of hydrogen, allowing the production and distribution of hydrogen to be optimized.

In an advantageous embodiment, other information relating to the vehicle 1, its movement, its driving or to the distribution station 7 is transmitted, voluntarily or automatically, to the control module 5. This information relates for example to the safety of the vehicle or of the users of the vehicle, the operating state of the engine, of the distribution station. The control module may then initiate corrective actions with the vehicle 1 and/or the station 7 and/or trigger visual and/or audible alarms and/or trigger actions with third parties, typically contacting emergency services, station maintenance 7 or vehicle repair 1.

The invention claimed is:

1. A method for allocating a supply of hydrogen between at least one moving vehicle to at least one distribution station comprising:
   a) collecting with at least two sensors onboard each vehicle of the at least one vehicle at least two parameters relating to an operation and driving of a corresponding vehicle of the at least one vehicle during movement of the corresponding vehicle, including at least geolocation of the corresponding vehicle, speed of the corresponding vehicle, and hydrogen fuel level in a tank of the corresponding vehicle,
   b) transmitting via a communication device in the corresponding vehicle the at least two parameters relating at least to the hydrogen fuel level and the geolocation of the corresponding vehicle to a control module,
   c) collecting with at least one sensor present in at least one hydrogen distribution station being fixed in location at least one parameter relating to hydrogen available in the at least one hydrogen distribution station,
   d) transmitting the at least one parameter relating to the hydrogen fuel levels available in the at least one hydrogen distribution station collected in step c) to the control module,
   e) transmitting data regarding hydrogen fuel levels in the at least one hydrogen distribution station and a restocking forecast for the at least one hydrogen station to the control module,
   f) identifying via the control module one or more hydrogen distribution stations of the at least one hydrogen distribution station that is capable of refueling the corresponding vehicle,
   g) informing via the control module a user of the corresponding vehicle of the one or more hydrogen distribution stations of the at least one hydrogen distribution station capable of refueling the at least one vehicle and of hydrogen refueling conditions in the one or more hydrogen distribution stations,
   h) informing via the control module the user of the corresponding vehicle of a hydrogen refueling offer including a refueling price adapted to a hydrogen fuel level of the corresponding vehicle and a suggested hydrogen distribution station for refueling, and
   i) a refueling choice is made by the user,
   j) transmitting via the communication device the refueling choice to at least the control module.

2. The method according to claim 1, wherein additional sensors for collecting parameters relating to a load of the corresponding vehicle, a tire pressure of the corresponding vehicle, a presence of a trailer attached to the corresponding vehicle, an acceleration of the corresponding vehicle, and traffic conditions surrounding the corresponding vehicle are embedded in the corresponding vehicle.

3. The method according to claim 1, wherein the control module is housed in a server remote from the at least one hydrogen distribution station.

4. The method according to claim 1, wherein if, at step j), the user does not accept the hydrogen refueling offer sent by the control module, then the refueling price is reassessed.

5. The method according to claim 1, wherein during step h), the refueling price offered takes into account a presence of a hydrogen supply package and the user's preferences concerning a choice of the at least one hydrogen distribution station.

6. The method according to claim 1, wherein during step h), the user of the corresponding vehicle is informed when the corresponding vehicle is at a defined distance from a hydrogen distribution station of the at least one hydrogen distribution stations.

7. The method according to claim 1, wherein the information sent to the user of the corresponding vehicle at steps g) and h) is regularly updated.

8. The method according to claim 1, wherein after step h), the user of the corresponding vehicle selects and makes an appointment at another hydrogen distribution station of the at least one hydrogen distribution station via the control module.

* * * * *